United States Patent
Huang et al.

(10) Patent No.: US 10,135,135 B2
(45) Date of Patent: Nov. 20, 2018

(54) ARRAY ANTENNA AND ANTENNA SYSTEM

(71) Applicant: Wistron NeWeb Corporation, Hsinchu (TW)

(72) Inventors: Guo-Shu Huang, Hsinchu (TW); Hsin-Lung Hsiao, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 331 days.

(21) Appl. No.: 15/170,936

(22) Filed: Jun. 1, 2016

(65) Prior Publication Data

US 2017/0170558 A1    Jun. 15, 2017

(30) Foreign Application Priority Data

Dec. 15, 2015  (TW) .............................. 104142047 A (51) Int. Cl.
| | |
|---|---|
| *H01Q 3/26* | (2006.01) |
| *G01S 13/93* | (2006.01) |
| *H01Q 3/30* | (2006.01) |
| *H01Q 25/00* | (2006.01) |
| *G01S 7/02* | (2006.01) |
| *G01S 13/44* | (2006.01) |
| *H01Q 1/32* | (2006.01) |

(52) U.S. Cl.
CPC ......... *H01Q 3/2682* (2013.01); *G01S 13/931* (2013.01); *H01Q 3/30* (2013.01); *H01Q 25/00* (2013.01); *G01S 7/025* (2013.01); *G01S 13/4445* (2013.01); *G01S 13/4454* (2013.01); *G01S 2013/9389* (2013.01); *H01Q 1/3275* (2013.01)

(58) Field of Classification Search
CPC .... H01Q 3/2682; H01Q 3/34; G01S 13/4445; G01S 13/4454; G01S 13/4463; G01S 13/4481; G01S 3/32–3/325
See application file for complete search history.

(56) References Cited

U.S. PATENT DOCUMENTS

| 7,286,093 B2 | 10/2007 | Artis |
| 7,900,340 B2 | 3/2011 | Artis |
| 2007/0182619 A1* | 8/2007 | Honda .................. G01S 13/931 |
| | | 342/80 |
| 2015/0255867 A1 | 9/2015 | Inoue |

FOREIGN PATENT DOCUMENTS

| CN | 104852139 A | 8/2015 |
| TW | 201510550 A | 3/2015 |

* cited by examiner

*Primary Examiner* — Bernarr E Gregory
*Assistant Examiner* — Fred H Mull
(74) *Attorney, Agent, or Firm* — Winston Hsu (57) ABSTRACT

An array antenna forms a main beam, and the main beam is toward a beam direction. The array antenna includes a plurality of radiating elements with a plurality of central line segments, where the plurality of radiating elements are arranged along a straight line, and the straight line is connecting the plurality of central line segments; and a plurality of meanders connecting the plurality of radiating elements; where the array antenna is disposed on a first plane, the beam direction has a nonzero deviating angle with a normal direction of the first plane, and the normal direction is perpendicular to the first plane.

15 Claims, 8 Drawing Sheets

ARRAY ANTENNA AND ANTENNA SYSTEM

BACKGROUND OF THE INVENTION

1. Field of the Invention

The present invention relates to an array antenna and antenna system, and more particularly, to an array antenna and antenna system achieving a comparable detecting range in a horizontal direction and a vertical direction.

2. Description of the Prior Art

An array antenna is an antenna system composed of a plurality of identical antennas arranged in accordance with a specific rule. Through proper arrangement of antenna element of the array antenna, a specific radiation pattern is achieved to concentrate a main beam at a specific direction to transmit signals. For example, for vehicular radar systems, the array antenna is configured to perform 2-dimensional sensing in horizontal direction. However, in practical applications, the 2-dimensional sensing over only the horizontal direction may receive reflections from objects (such as notice boards, traffic lights, bridges, buildings, etc.) which are higher than a horizontal plane. Due to hardware limitations, a false alarm is usually caused and system performance is degraded. In such a situation, if the vehicular radar system provides a radio frequency (RF) system with a three dimensional scanning function to sense over both the horizontal direction and the vertical direction simultaneously. Reflections from the horizontal direction and the vertical direction are more distinguishable, such that system reliability is enhanced and the false alarm rate is further reduced.

Traditionally, an intuitive way to obtain sensing capability in different directions is to deploy another set of array antennas, and arrange the array antennas so as to sense over the vertical direction. However, vehicular radar systems utilize wireless signal transceivers disposed inside vehicle bumpers or grills for ranging and information exchange applications. Since shock-absorbing Styrofoam or glass fibers are usually disposed inside the vehicle bumpers, the available space is limited. It is hard to accommodate another set of array antennas. Furthermore, if the vehicular radar systems are produced for sales of after-market, i.e. vendors for the radar systems do not participate in decision-making of materials and thickness of the bumpers, in such a condition, design requirements for the array antenna gain, the area and the radiation patterns become stricter for adapting to different cars.

A dual polarized antenna system including a horizontally polarized antenna and a vertically polarized antenna has been developed in the prior art, to provide object scanning and detecting in both the horizontal direction and the vertical direction. However, it is difficult to achieve the same detection range using the horizontally polarized antenna and the vertically polarized antenna in the prior art, which lowers performance of the antenna system. In addition, the horizontally polarized antenna and the vertically polarized antenna have to be designed individually, and have to be realized by a particular stacking structure, which have high design complexity and production cost.

Therefore, how to achieve substantially same detecting range in the horizontal direction and the vertical direction is a significant objective in the field.

SUMMARY OF THE INVENTION

It is therefore a primary objective of the present invention to provide an array antenna and antenna system achieving substantially the same detecting range in a horizontal direction and a vertical direction, to improve over disadvantages of the prior art.

An embodiment of the present invention discloses an array antenna forming a main beam. The main beam is toward a beam direction. The array antenna comprises a plurality of radiating elements comprising a plurality of central line segments, wherein the plurality of radiating elements is arranged along a straight line, and the straight line is connecting through the plurality of central line segments; and a plurality of meanders connecting the plurality of radiating elements; wherein the array antenna is disposed on a first plane, a nonzero deviating angle is between the beam direction and a normal direction of the first plane, and the normal direction is perpendicular to the first plane.

An embodiment of the present invention further discloses an antenna system. The antenna system comprises a first array antenna forming an main beam towards a beam direction; and a first deviating array antenna forming an deviating main beam towards a deviating beam direction; wherein an angle between the beam direction and the deviating beam direction has nonzero degrees.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
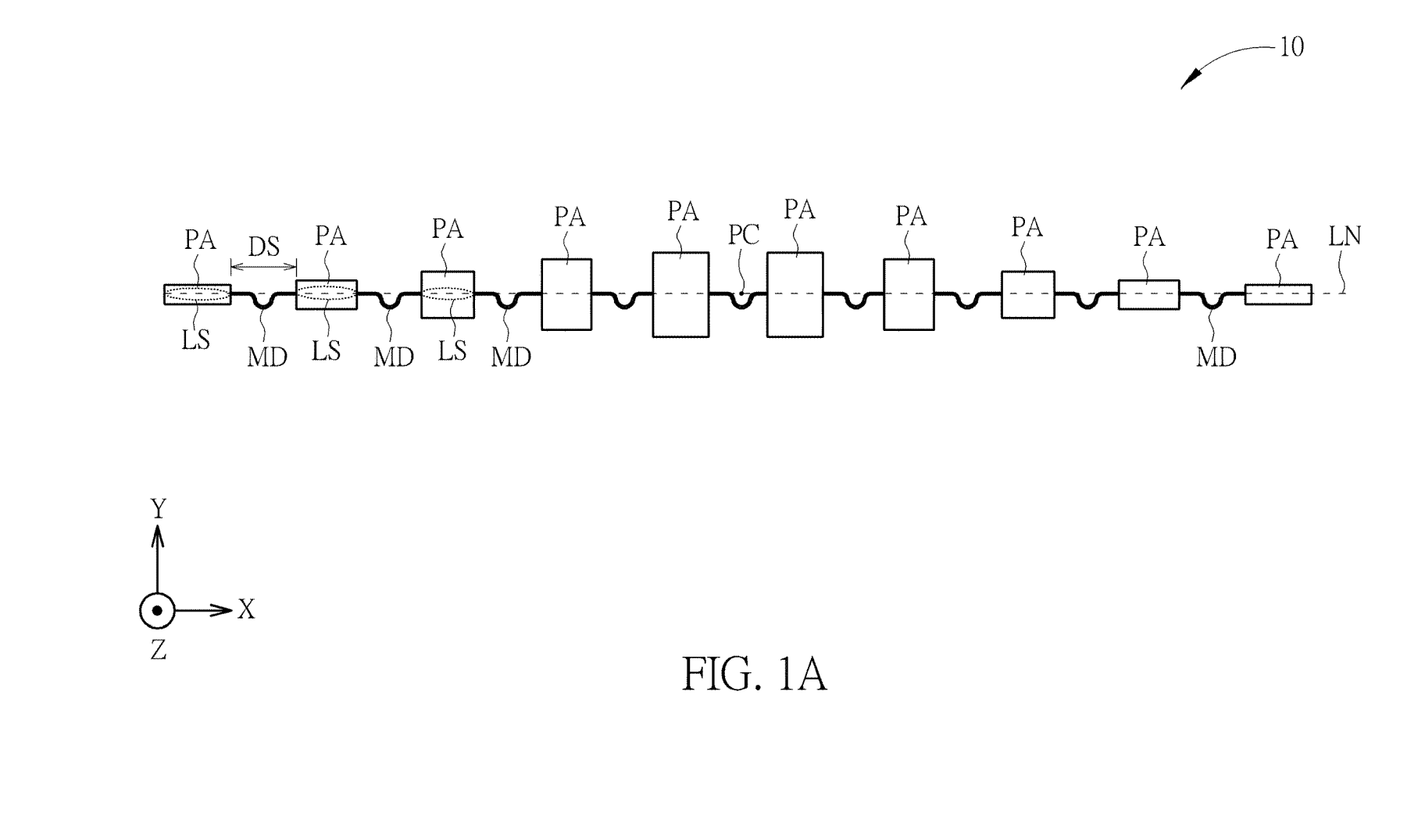
FIG. 1A is a schematic diagram of a top view of an array antenna according to an embodiment of the present invention.
Figure 1B:
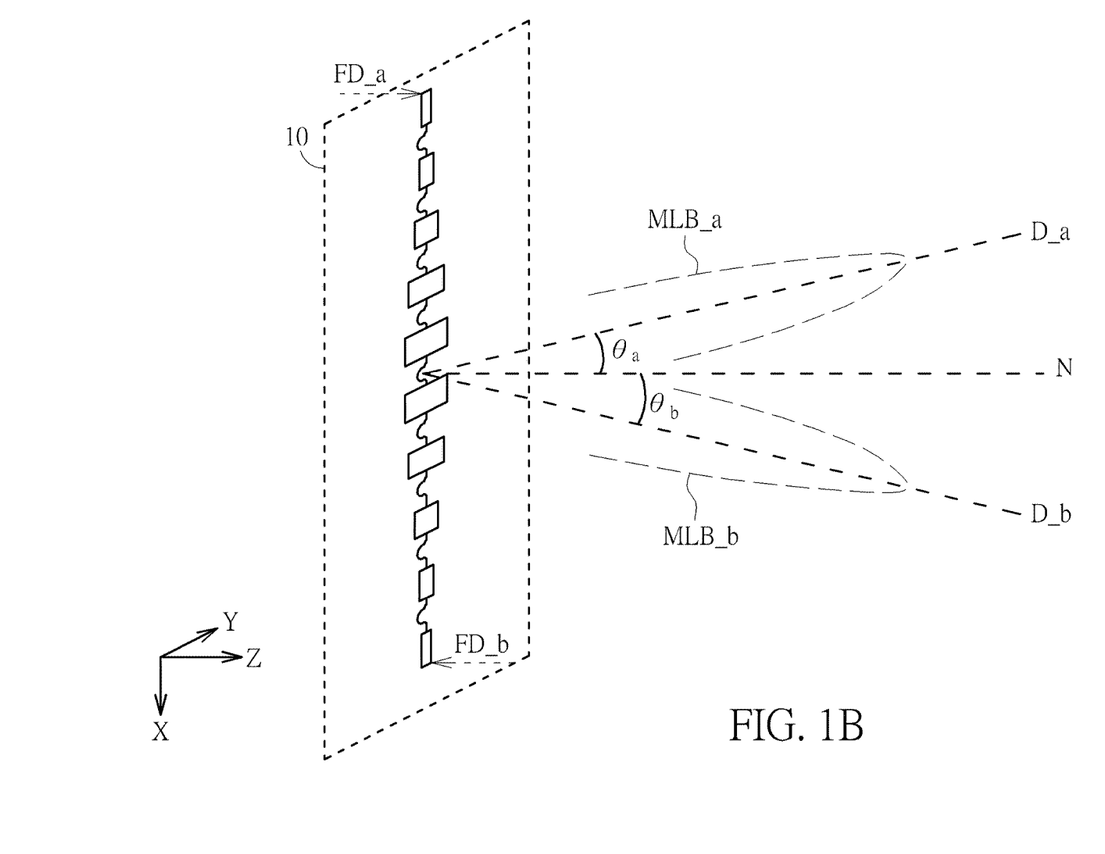
FIG. 1B is a schematic diagram of an isometric view of an array antenna according to an embodiment of the present invention.
Figure 6:
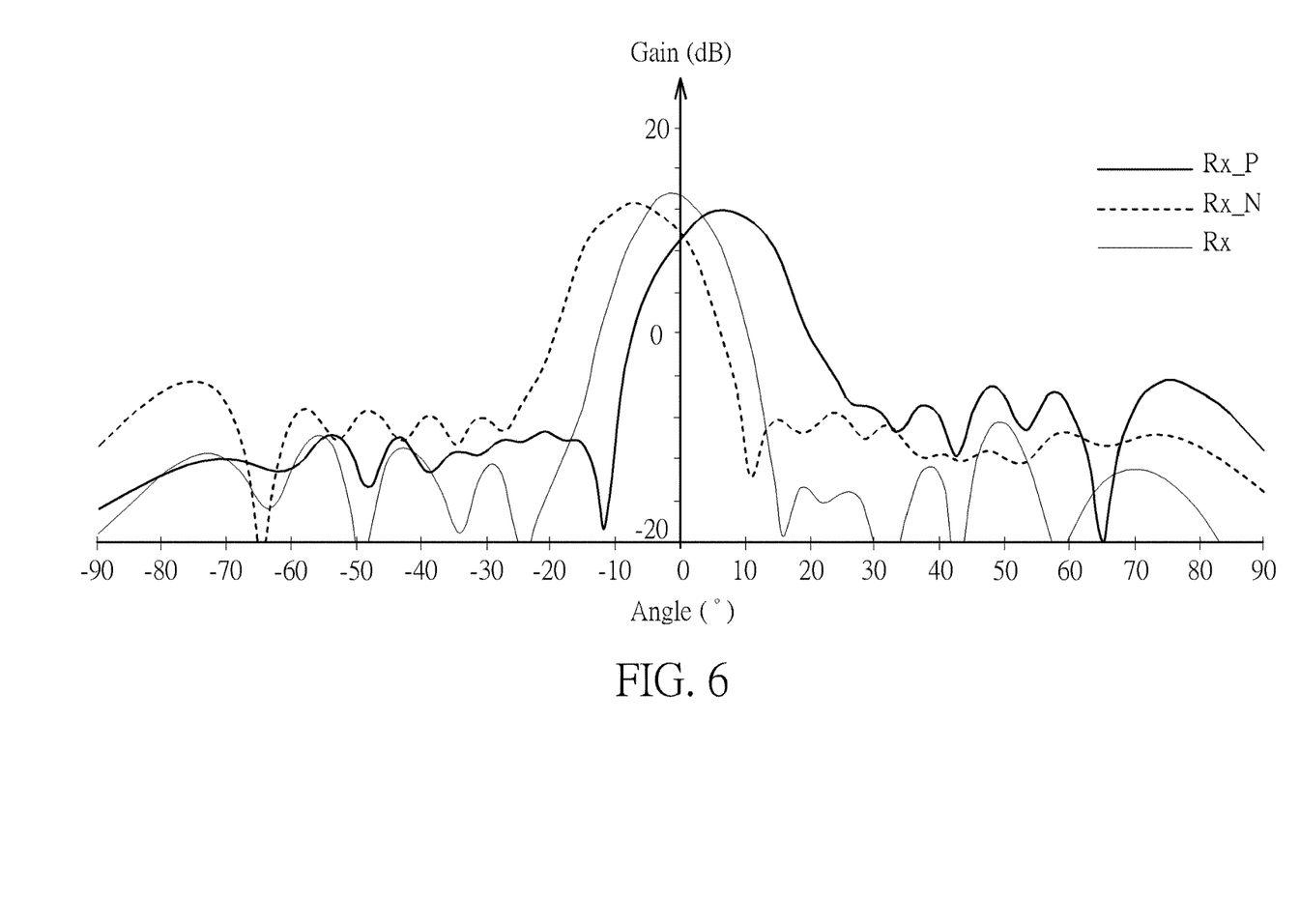
FIG. 6 is a diagram of an antenna radiation pattern of the array antenna in FIG. 1A.

FIGS. 1A and 1B are schematic diagrams of a top view and an isometric view of an array antenna 10 according to an embodiment of the present invention. FIGS. 1A and 1B include a coordination system labeled by X, Y and Z axes. The array antenna 10 comprises a plurality of radiating elements PA and a plurality of meanders MD. The plurality of meanders MD connect the plurality of radiating elements PA. The plurality of radiating elements PA is arranged along a straight line LN. Each radiating element PA has a central line segment LS, i.e., the plurality of radiating elements PA comprises a plurality of central line segments LS. The straight line LN penetrates through (or connects through) the plurality of central line segments LS. The plurality of meanders MD connects the plurality of radiating elements PA. Two terminals of each meander MD are connected to the central line segments LS of the adjacent radiating elements PA. The array antenna 10 comprises a phase center PC, and the array antenna 10 is symmetric with respect to the phase center PC. A direct distance DS is between the radiating elements PA, and the meander MD has a length L_MD. The length L_MD is a length difference δ longer than the direct distance DS, where the length difference δ is greater than zero. In an embodiment, the length difference δ may be related to a wavelength λ of electromagnetic wave transmitted by the array antenna 10. For example, the length difference δ may be 0.11λ, where λ represents the wavelength. The plurality of meanders MD may form a phase difference φ between the plurality of radiating elements PA, and the phase difference φ is proportional to the length L_MD of the meander MD. The longer the length L_MD of the meander MD, the larger the phase difference φ. Specifically, please refer to FIG. 6, which is a diagram of an antenna radiation pattern of the array antenna 10. In FIG. 6, a dashed line and a bold solid line represent an antenna radiation pattern when the length L_MD of the array antenna 10 is longer than the direct distance DS (i.e., the length difference δ is greater than zero), and a thin solid line represents an antenna radiation pattern when the length difference δ is equal to zero. As FIG. 6 shows, the length difference δ between the length L_MD of the meander MD and the direct distance DS results in the phase difference φ, such that a main beam formed by the array antenna 10 deviates.

In detail, the array antenna 10 may be disposed on a first plane constructed by the X axis and the Y axis. The first plane has a normal direction N, where the normal direction N is perpendicular to the first plane (i.e., parallel to the Z axis). In general, the array antenna 10 may form a main beam MLB. The main beam MLB is toward a beam direction D, and a nonzero deviating angle θ is between the beam direction D and the normal direction N. As FIG. 1B shows, as the array antenna 10 is fed-in from a feeding-in point FD_b (a terminal of the array antenna 10), the array antenna 10 may form a main beam MLB_a. The main beam MLB_a is toward a beam direction D_a, and a nonzero deviating angle $θ_a$ is between the beam direction D_a and the normal direction N. As the array antenna 10 is fed-in from a feeding-in point FD_a (another terminal of the array antenna 10), the array antenna 10 may form a main beam MLB_b. The main beam MLB_b is toward a beam direction D_b, and a nonzero deviating angle $θ_b$ is between the beam direction D_b and the normal direction N.

Figure 2:
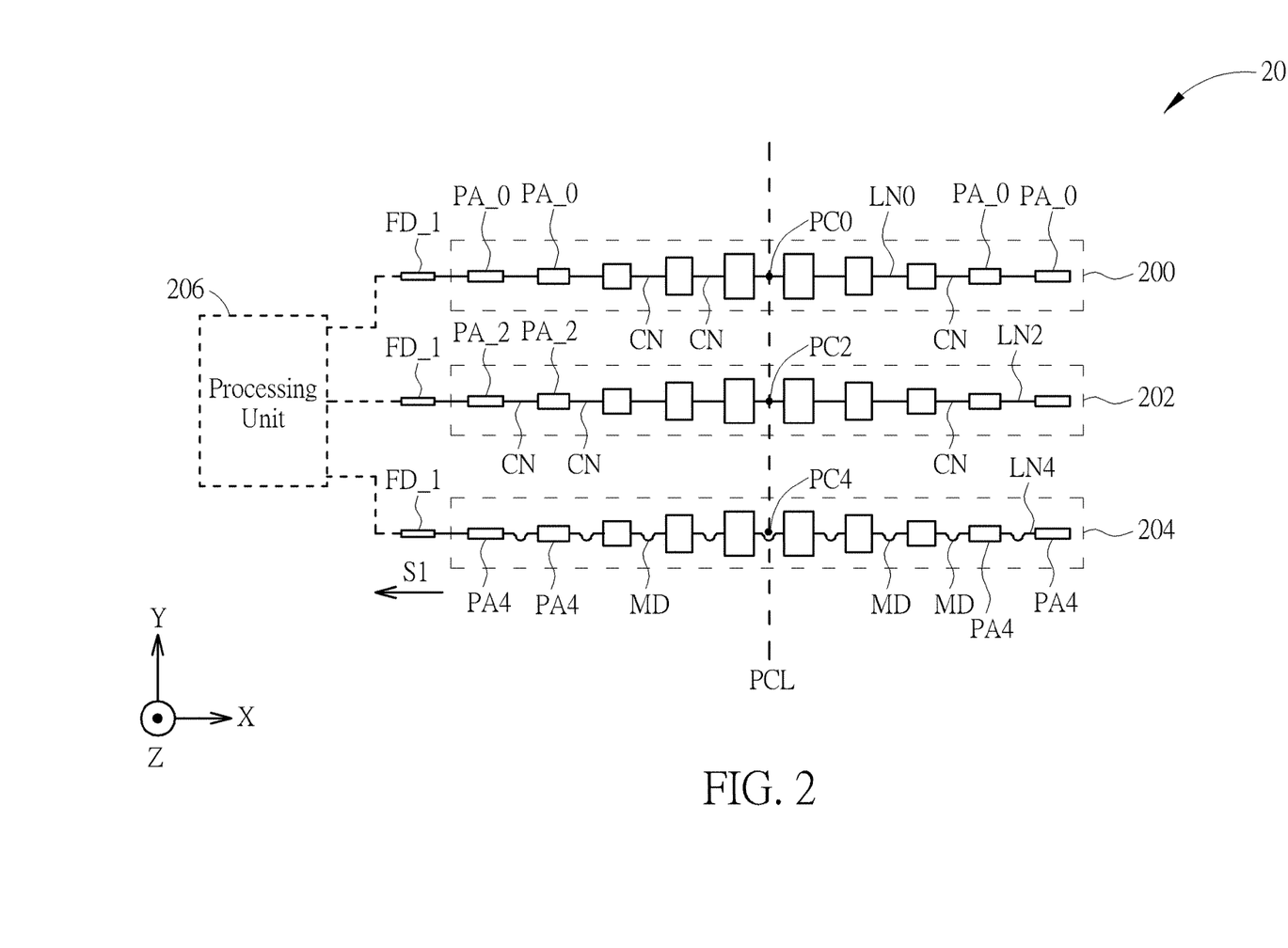
FIG. 2 is a schematic diagram of a top view of an antenna system according to an embodiment of the present invention.
Figure 3:
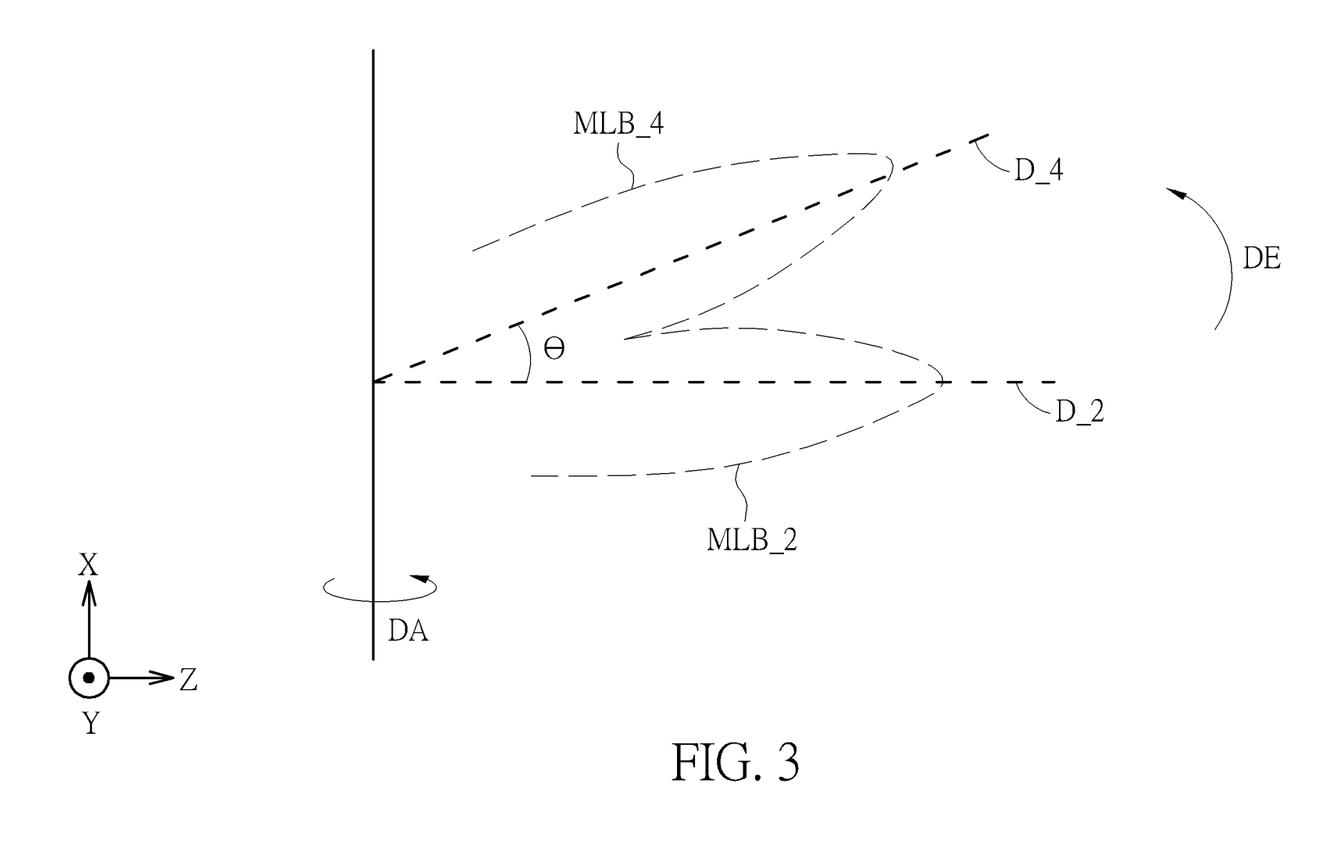
FIG. 3 is a diagram of an antenna radiation pattern of the antenna system in FIG. 2.

In short, the array antenna 10 utilizes the meanders MD to form the phase difference φ between the radiating elements PA. Therefore, the beam direction D of the main beam MLB formed by the array antenna 10 may deviate from the normal direction N of the first plane. The array antenna 10 may be applied in an antenna system. Please refer to FIG. 2 and FIG. 3. FIG. 2 is a schematic diagram of a top view of an antenna system 20 according to an embodiment of the present invention. FIG. 3 is a diagram of an antenna radiation pattern of the antenna system 20. FIGS. 2 and 3 also include the coordination system labeled by the X, Y and Z axes. The antenna system 20, which is a single polarized antenna system, is a one transmit two receive (1T2R) radar antenna system using frequency-modulated continuous wave (FMCW). The antenna system 20 is disposed on the first plane constructed by the X axis and the Y axis. The antenna system 20 may be applied on a vehicular radar system, which is vertically disposed within the bumpers or the fan grills of the vehicle. The antenna system 20 comprises a transmitting array antenna 200, an array antenna 202 and a deviating array antenna 204. The deviating array antenna 204 may be realized by the array antenna 10. The transmitting array antenna 200 is configured to transmit a signal. The array antenna 202 and the deviating array antenna 204 are configured to receive a reflected signal. Specifically, the array antenna 202 forms a main beam MLB_2, and the main beam MLB_2 is toward a beam direction D_2. The deviating array antenna 204 forms a deviating main beam MLB_4, and the deviating main beam MLB_4 is toward a deviating beam direction D_4. Note that, a difference angle θ between the beam direction D_2 and the deviating main beam MLB_4 has nonzero degrees.

In detail, the transmitting array antenna 200 comprises a plurality of transmitting radiating elements PA0 and a plurality of direct connecting elements CN. The plurality of transmitting radiating elements PA0 is arranged along a straight line LN0. The transmitting array antenna 200 comprises a transmitting phase center PC0, and the transmitting array antenna 200 is symmetric with respect to the transmitting phase center PC0. The array antenna 202 comprises a plurality of radiating elements PA2. The plurality of radiating elements PA2 is arranged along a straight line LN2. The array antenna 202 comprises a phase center PC2, and the array antenna 202 is symmetric with respect to the phase center PC2. The deviating array antenna 204 comprises a plurality of deviating radiating elements PA4 and a plurality of meanders MD. The plurality of deviating radiating elements PA4 is arranged along a deviating straight line LN4. The deviating array antenna 204 comprises a deviating phase center PC4, and the deviating array antenna 204 is symmetric with respect to the deviating phase center PC4. The straight lines LN0, LN2, LN4 are parallel to each other. The transmitting phase center PC0, the phase center PC2 and the deviating phase center PC4 are aligned along with a phase center line PCL, and the phase center line PCL is perpendicular to the straight lines LN0, LN2, LN4.

Notably, in the array antenna 202, the plurality of direct connecting elements CN is utilized to connect the plurality of radiating elements PA2 as/into a series, such that the beam direction D_2 corresponding to the main beam MLB_2 is parallel to the normal direction N of the first plane (i.e., be parallel to the Z axis). On the other hand, in the deviating array antenna 204, the plurality of meanders MD is utilized to connect the plurality of deviating radiating elements PA4 as/into a series. The plurality of meanders MD forms the phase difference φ between the deviating radiating elements PA4, such that the deviating beam direction D_4 deviates from the beam direction D_2, i.e., the difference angle θ between the beam direction D_2 and the deviating beam direction D_4 corresponding to the deviating main beam MLB_4 has nonzero degrees.

In addition, the antenna system 20 further comprises a processing unit 206. The processing unit 206 is coupled to the transmitting array antenna 200, the array antenna 202, and the deviating array antenna 204. Specifically, the processing unit 206 is coupled to the transmitting array antenna 200, the array antenna 202, and the deviating array antenna 204 at a plurality of feeding-in points FD_1. In the antenna system 20, the plurality of feeding-in points FD_1 is located at a first side S1 of the antenna system 20. As the single polarized antenna system, the transmitting array antenna 200, the array antenna 202, and the deviating array antenna 204 is fed-in from the first side S1 of the antenna system 20. The processing unit 206 may operate in an amplitude-comparison mono-pulse mode or a phase-comparison mono-pulse mode. In an embodiment, the antenna system 20 is disposed on an XY plane. The array antenna 202 and the deviating array antenna 204 form the main beam MLB_2 and the main beam MLB_4 toward different angles along a first direction DE parallel to an XZ plane. Therefore, the antenna system 20 may utilize the transmitting array antenna 200, the array antenna 202, and the deviating array antenna 204 to operate in the amplitude-comparison mono-pulse mode, so as to detect an object and recognize an angle of the object in the XZ plane (along the first direction DE). Meanwhile, the main beams MLB_2, MLB_4 have no angle difference along a second direction DA parallel to an YZ plane. Therefore, the antenna system 20 may utilize the transmitting array antenna 200, the array antenna 202, and the deviating array antenna 204 to operate in the phase-comparison mono-pulse mode, so as to detect the object and recognize an angle of the object in the YZ plane (along the second direction DA). Specifically, when the antenna system 20 is vertically disposed on a vertical plane (the XY plane is the vertical plane and the YZ plane is a horizontal plane), the first direction DE is a vertical/elevation direction and the second direction DA is a horizontal/azimuth direction.

Figure 7:
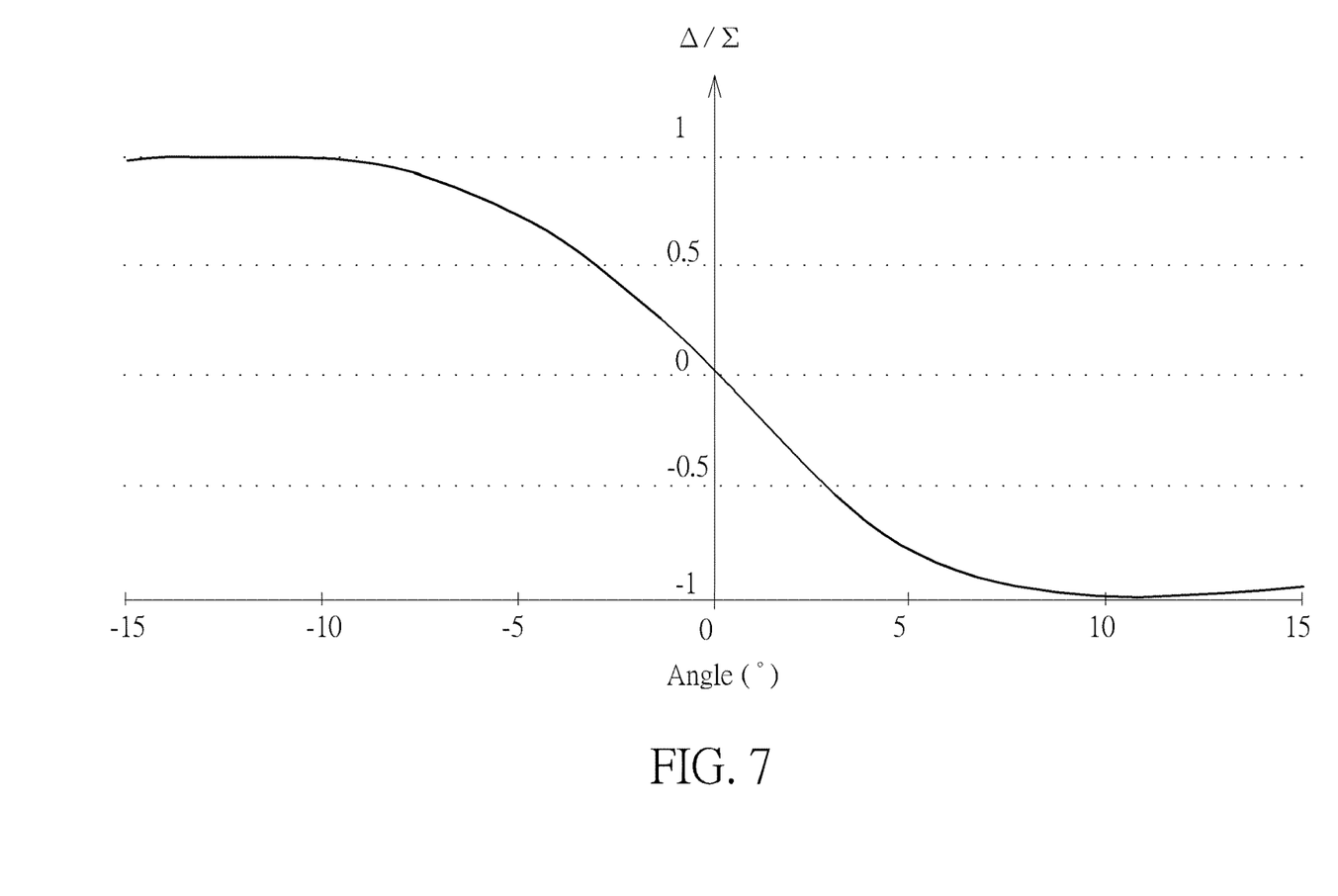
FIG. 7 is a diagram of a delta-to-sum ratio of the antenna system in FIG. 2.

Please refer to FIG. 7, which is a diagram of a delta-to-sum ratio ($\Delta/\Sigma$) of the antenna system 20 operating in the amplitude-comparison mono-pulse mode. As can be seen from FIG. 7, the antenna system 20 may detect objects and recognize angles of the objects in the XZ plane, and an angular scanning scope of the antenna system 20 is substantially plus-and-minus 10 degrees.

Figure 4:
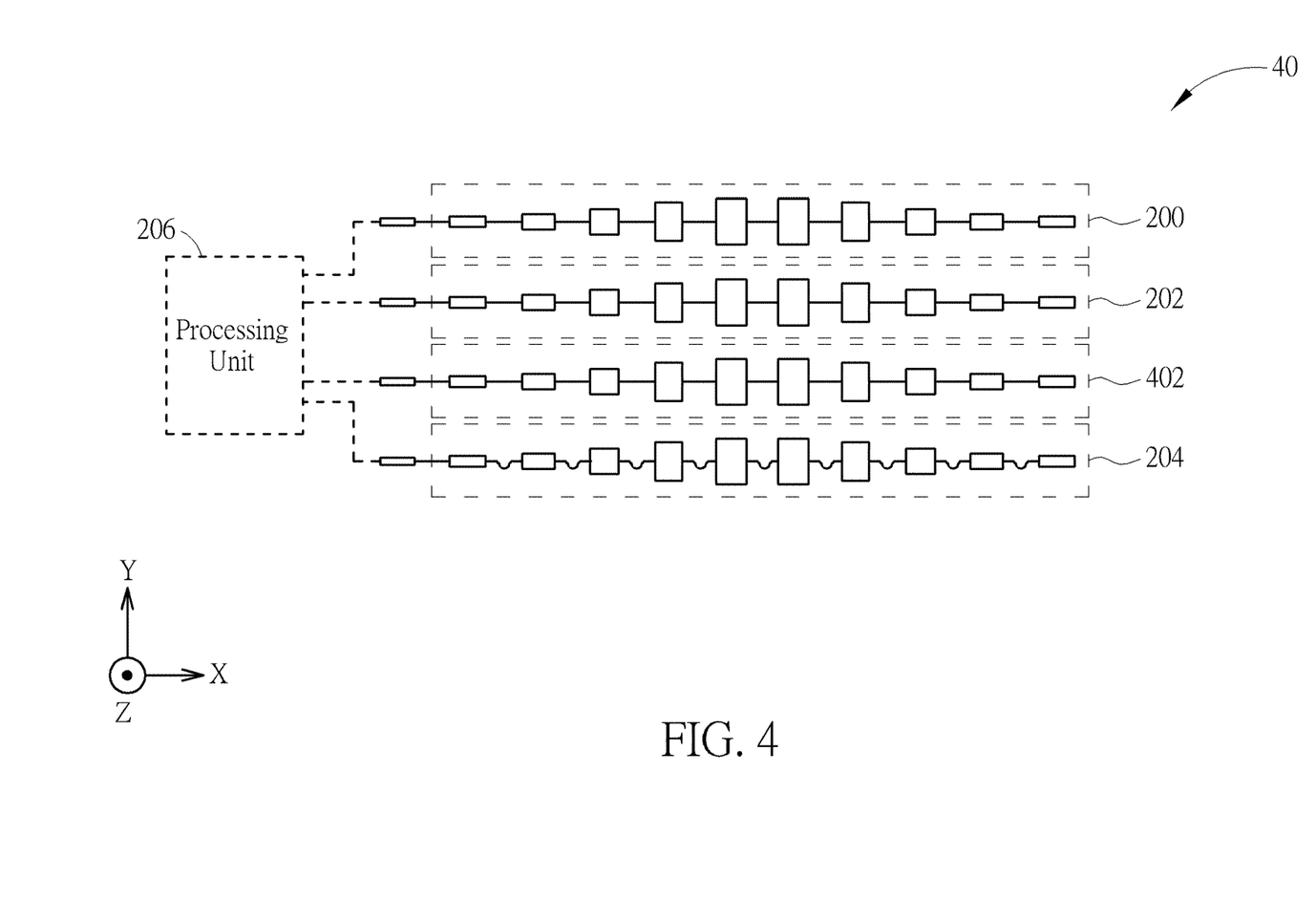
FIG. 4 is a schematic diagram of a top view of an antenna system according to an embodiment of the present invention.

In addition, FIG. 4 is a schematic diagram of a top view of an antenna system 40 according to an embodiment of the present invention. FIG. 4 also includes the coordination system labeled by the X, Y and Z axes. The antenna system 40 is similar to the antenna system 20, and thus, the same components are denoted by the same symbols. Different from the antenna system 20, the antenna system 40 further comprises an array antenna 402. The array antenna 402 is configured to receive the reflected signal, which means that the antenna system 40 is a one transmit three receive (1T3R) antenna system. The array antenna 402 has the same structure as the array antenna 202, which means that the array antennas 202, 402 form main beams toward beam directions parallel to the Z axis. The antenna system 40 may utilize the transmitting array antenna 200 and the array antennas 202, 402 to operate in the phase-comparison mono-pulse mode. In addition, the antenna system 40 may utilize the transmitting array antenna 200 and the array antenna 202 (or the array antenna 402) as well as the deviating array antenna 204 to operate in the amplitude-comparison mono-pulse mode. Similarly, when the antenna system 40 is vertically disposed on a vertical plane (XY plane), the antenna system 40 may detect objects and recognize angles of the objects along the second direction DA on the YZ plane using the phase-comparison mono-pulse mode. Meanwhile, the antenna system 40 may detect objects and recognize angles of the objects along the first direction DE on the XZ plane using the amplitude-comparison mono-pulse mode. Notably, in the antenna system 20, a gain on the YZ plane of the deviating array antenna 204 is smaller than the one of the array antenna 202, such that a detecting range of the antenna system 20 on the YZ plane is slightly short. In comparison, the antenna system 40 utilize the array antennas 202 and 402 to enhance gain on the YZ plane, so as to increase the detecting range of the antenna system 40 on the YZ plane. In sum, the antenna system 40 utilizes one of the array antennas 202, 402 and the deviating array antenna 204 to receive the reflected signal, and operates in the phase-comparison mono-pulse mode and the amplitude-comparison mono-pulse mode. In addition, the antenna system 40 would have a better isolation between the first direction DE and the second direction DA, by choosing different combinations of array antennas in the phase-comparison mono-pulse mode and the amplitude-comparison mono-pulse mode.

Figure 5:
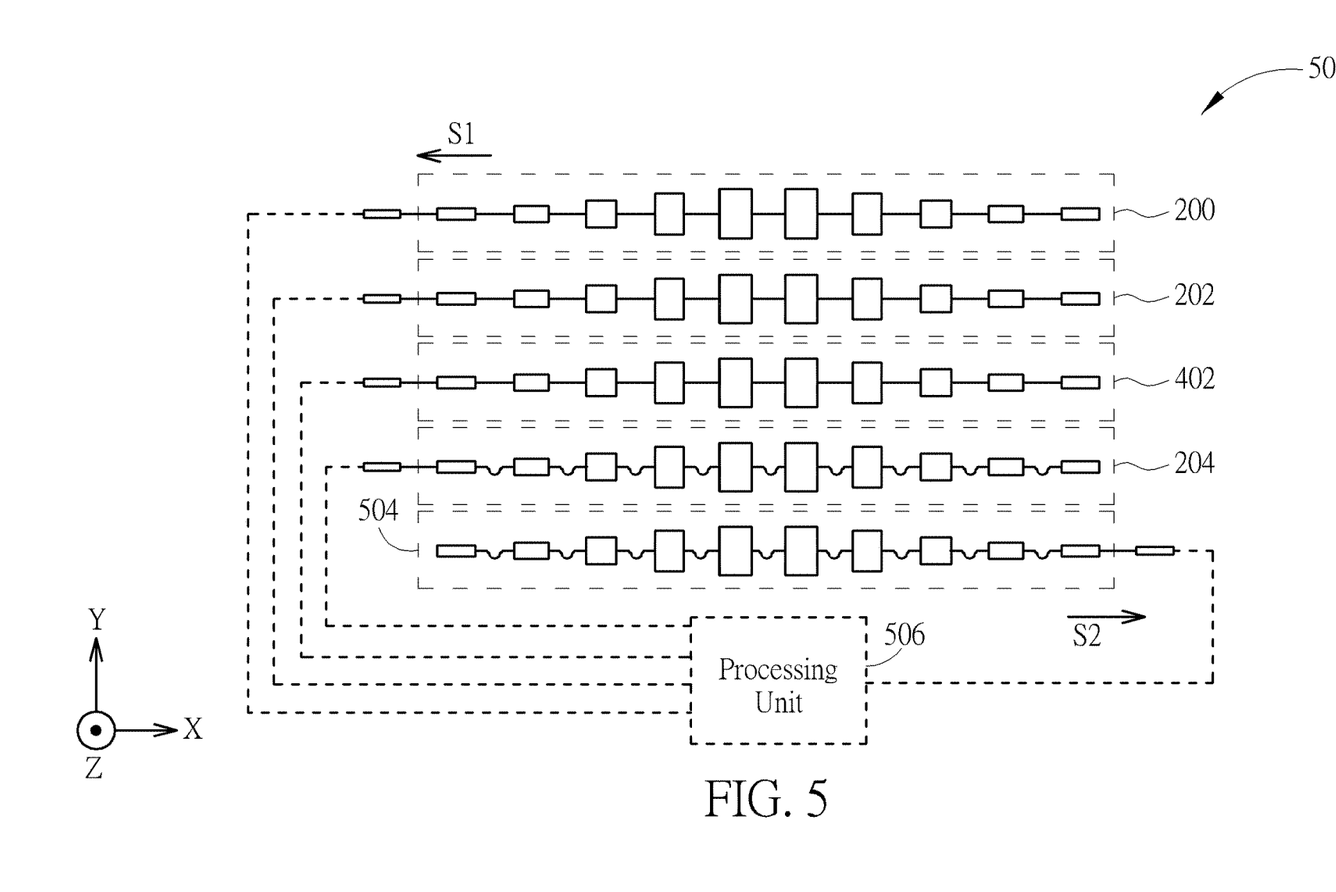
FIG. 5 is a schematic diagram of a top view of an antenna system according to an embodiment of the present invention.

In addition, FIG. 5 is a schematic diagram of a top view of an antenna system 50 according to an embodiment of the present invention. FIG. 5 also includes the coordination system labeled by the X, Y and Z axes. The antenna system 50 is similar to the antenna system 40, and thus, the same components are denoted by the same symbols. Different from the antenna system 40, the antenna system 50 further comprises a deviating array antenna 504. The deviating array antenna 504 has the same structure as the deviating array antenna 204. The deviating array antenna 504 is also configured to receive the reflected signal, which means that the antenna system 50 is a one transmit four receive (1T4R) antenna system. In addition, a feeding-in position of the deviating array antenna 504 is different from feeding-in positions of the transmitting array antenna 200, the array antennas 202, 402 and the deviating array antenna 204. The transmitting array antenna 200, the array antennas 202, 402 and the deviating array antenna 204 are fed-in from a first side S1 of the antenna system 50 (i.e., be coupled to a processing unit 506 via the first side S1 of the antenna system 50), and the deviating array antenna 504 are fed-in from a second side S2 of the antenna system 50 (i.e., be coupled to the processing unit 506 via the second side S2 of the antenna system 50). Notably, the deviating array antenna 204 and the deviating array antenna 504 have different feeding-in positions, such that main beams formed by the deviating array antenna 204 and the deviating array antenna 504 deviate a positive angle and a negative angle, respectively, from the Z axis. For certain applications, the antenna system 50 may utilize the transmitting array antenna 200 and the deviating array antennas 204, 504 to operate in the amplitude-comparison mono-pulse mode, such that an angular scanning scope and a detecting range on the XZ plane of the antenna system 50 is larger than the ones of the antenna system 40.

Notably, the embodiments stated in the above are utilized for illustrating the concept of the present invention. Those skilled in the art may make modifications and alternations accordingly, and not limited herein. For example, in FIG. 4, the antenna system 40 is not limited to use the transmitting array antenna 200 and the array antennas 202, 402 to operate in the phase-comparison mono-pulse mode. As long as the antenna system 40 utilizes any two array antennas among the array antennas 202, 402 and the deviating array antenna 204 to receive the reflected signal, the processing unit 206 of the antenna system 40 may control the antenna system 40 to operate in the phase-comparison mono-pulse mode, which is also within the scope of the present invention.

In addition, in FIG. 5, the antenna system 50 is not limited to use the transmitting array antenna 200 and the deviating array antenna 204, 504 to operate in the amplitude-comparison mono-pulse mode. As long as the antenna system 50 utilizes any two array antennas which forms main beams toward different beam directions, the processing unit 206 of the antenna system 50 may control the antenna system 50 to operate in the amplitude-comparison mono-pulse mode. For example, the antenna system 50 may choose one array antenna among the array antennas 202, 402 and one deviating array antenna among the deviating array antennas 204, 504 to receive the reflected signal, so as to operate in the amplitude-comparison mono-pulse mode, which is also within the scope of the present invention. In addition, the antenna system 50 may choose any two array antennas among the array antennas 202, 402 and the deviating array antennas 204, 504 to receive the reflected signal, so as to operate in the phase-comparison mono-pulse mode, which is also within the scope of the present invention.

In summary, the array antenna of the present invention utilizes meanders to connect the plurality of radiating elements, such that the beam direction of the main beam formed by the array antenna deviates from the normal direction of the plane on which the array antenna is disposed. In addition, the antenna system of the present invention utilizes the array antennas forming the main beams toward different beam directions to perform object detecting and angular scanning on the vertical direction, so as to achieve comparable detecting range in both vertical direction and horizontal direction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An array antenna, forming a main beam, wherein the main beam is toward a beam direction, the array antenna comprising:
   a plurality of radiating elements disposed on a first plane, comprising a plurality of central line segments, wherein the plurality of radiating elements is arranged along a straight line, and the straight line is connecting through the plurality of central line segments; and
   a plurality of meanders, connecting the plurality of radiating elements on the first plane, such that the plurality of radiating elements and the plurality of meanders form a series along the straight line on the first plane;
   wherein the array antenna is disposed on the first plane, a nonzero deviating angle is between the beam direction and a normal direction of the first plane, and the normal direction is perpendicular to the first plane.

2. The array antenna of claim 1, wherein the array antenna comprises a phase center, and the array antenna is symmetric with respect to the phase center.

3. The array antenna of claim 1, wherein lengths of the plurality of meanders are related to the deviating angle.

4. The array antenna of claim 1, wherein the array antenna is fed-in from a terminal of the array antenna.

5. An antenna system, the antenna system comprising:
   a first array antenna, disposed on a first plane, forming a main beam towards a beam direction; and
   a first deviating array antenna, forming a deviating main beam towards a deviating beam direction, comprising:
      a plurality of deviating radiating elements, disposed on the first plane, comprising a plurality of central line segments, wherein the plurality of deviating radiating elements are arranged along a deviation straight line, and the deviation straight line is connecting through the plurality of central line segments; and
      a plurality of meanders, connecting the plurality of deviating radiating elements on the first plane, such that the plurality of radiating elements and the plurality of meanders form a series along the straight line on the first plane;
      wherein a nonzero deviating angle is between the deviating beam direction and a normal direction of the first plane, and the normal direction is perpendicular to the first plane;
   wherein an angle between the beam direction and deviating beam direction has nonzero degrees.

6. The antenna system of claim 5, wherein lengths of the plurality of meanders are related to the nonzero deviating angle.

7. The antenna system of claim 5, wherein the first array antenna comprises a plurality of first radiating elements and a plurality of direct connecting elements, the plurality of first radiating elements are arranged along a first straight line, the plurality of direct connecting elements connect the plurality of first radiating elements, and the first straight line is parallel to the deviation straight line.

8. The antenna system of claim 5, wherein the deviating array antenna comprises a deviation phase center, the first array antenna comprises a phase center, and the deviation phase center is aligned with the phase center.

9. The antenna system of claim 5, further comprising a second deviating array antenna which has the same structure as the first deviating array antenna, wherein the first deviating array antenna is fed-in from a first side of the antenna system, and the second deviating array antenna is fed-in from a second side of the antenna system.

10. The antenna system of claim 5, further comprising:
    a transmitting array antenna, configured to transmit a signal; and
    a processing unit, coupled to the first deviating array antenna, the first array antenna and the transmitting array antenna;
    wherein the processing unit controls the first deviating array antenna, the first array antenna and the transmitting array antenna, such that the antenna system operates in an amplitude-comparison mono-pulse mode or a phase-comparison mono-pulse mode.

11. The antenna system of claim 10, wherein the antenna system operates in the amplitude-comparison mono-pulse mode, the antenna system performs angle recognition in a first direction.

12. The antenna system of claim 11, wherein the antenna system operates in the phase-comparison mono-pulse mode, the antenna system performs angle recognition in a second direction which is different from the first direction.

13. The antenna system of claim 10, further comprising a second array antenna which has the same structure as the first array antenna, wherein the antenna system utilizes one array antenna of the first array antenna and the second array antenna, and the first deviating array antenna to operate in the amplitude-comparison mono-pulse mode; the antenna system utilizes two array antennas of the first array antenna, the second array antenna and the first deviating array antenna to operate in the phase-comparison mono-pulse mode.

14. The antenna system of claim 10, further comprising a second deviating array antenna which has the same structure as the first deviating array antenna and a second array antenna which has the same structure as the first array antenna, wherein the antenna system utilizes one array antenna of the first array antenna and the second array antenna, and one of the first deviating array antenna and the second deviating array antenna to operate in the amplitude-comparison mono-pulse mode; the antenna system utilizes two array antennas of the first array antenna, the second array antenna, the first deviating array antenna, and the second deviating array antenna to operate in the phase-comparison mono-pulse mode.

15. The antenna system of claim 14, wherein the antenna system utilizes the first deviating array antenna and the second deviating array antenna to operate in the amplitude-comparison mono-pulse mode; the antenna system utilizes two array antennas among the first array antenna, the second array antenna, the first deviation array antenna and the second deviating array antenna to operate in the phase-comparison mono-pulse mode, the first deviating array antenna is fed-in from a first side of the antenna system, and the second deviating array antenna is fed-in from a second side of the antenna system.

\* \* \* \* \*